FIG. 2.

June 13, 1950 R. B. HAYNES 2,511,059
INDUCTION HARDENING APPARATUS
Filed June 13, 1946 8 Sheets-Sheet 5

INVENTOR.
Robert B. Haynes
BY Owen & Owen
ATTORNEYS

June 13, 1950   R. B. HAYNES   2,511,059
INDUCTION HARDENING APPARATUS
Filed June 13, 1946   8 Sheets-Sheet 8

INVENTOR.
Robert B. Haynes
BY Owen & Owen
ATTORNEYS

Patented June 13, 1950

2,511,059

UNITED STATES PATENT OFFICE 2,511,059

INDUCTION HARDENING APPARATUS

Robert B. Haynes, Toledo, Ohio

Application June 13, 1946, Serial No. 676,487

5 Claims. (Cl. 266—4)

This invention relates to induction hardening apparatus by which elongated articles are passed through an induction heating device at an automatically controlled variable speed, and cooled or quenched progressively after the heating.

More particularly, it relates to apparatus of the kind described comprising a turret carrying a plurality of devices operative for induction hardening of a series of articles in succession, whereby the articles may be placed in the apparatus at one station about the turret and then properly treated during the rotation of the turret and prepared for removal.

The object of the invention is to provide induction hardening apparatus having a large capacity for treating a succession of elongated objects, such as axles, which require variable treatment at different points in their length.

A further object is to provide such a machine of the turret type which may be fed at one station with objects to be treated, and which will then treat the articles automatically and prepare them for removal.

Other objects and details of the invention will appear as the description proceeds.

In the accompanying drawings forming a part of this specification.

In the embodiment of the invention illustrated in the drawings, there is a machine constructed with a base 20 on which there is mounted a stationary drum 21 with a central stationary shaft 22 projecting upward therefrom. Around the shaft and over the top of the drum is a lower turret plate 23 and near the top of the shaft is an upper turret plate 24. Posts 25 connect plates 23 and 24, and they are also connected by a central sleeve 26 surrounding shaft 22. The turret rests upon a lower bearing 27 around shaft 22 and is also provided with an upper bearing 28 near the top of the shaft.

The turret carries a plurality of treating units which are all substantially identical. In the construction shown there are indicated six of these units. Each unit comprises an upper head 29 with depending parallel vertical posts 30 connected at their lower ends by a plate 31. The several units are connected at the bottom by connecting plates 32.

A motor 36 is provided for turning the turret. A gear 37 is attached to the bottom of the turret immediately over the drum and meshes with a gear 38 which is connected by a suitable drive 39 to the motor 36.

Since the units are all alike, the description of one will suffice for all.

Figure 10:
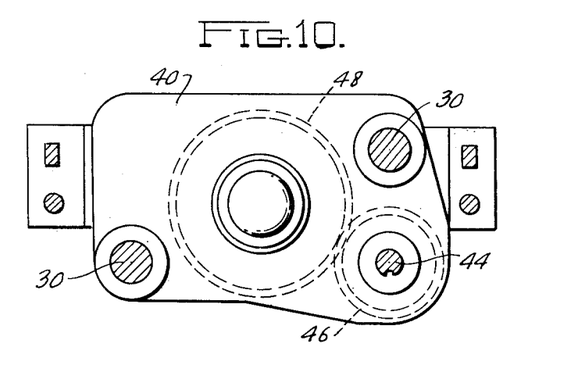
Fig. 10 is a plan view of the upper chuck on line 10—10 of Fig. 7.

An upper chuck carrier 40 is connected to a lower chuck carrier 41 by means of a sleeve 42, and both carriers are slidably mounted on posts 30. On the head 29 there is mounted a motor 43 which drives a shaft 44 through suitable reduction gearing 45. A gear 46 (see Fig. 10) is splined upon shaft 44 at the upper end of sleeve 42 and, as the chucks move upward and downward, the shaft slides through the gear and telescopes within the sleeve 42. The upper chuck member 47, mounted rotatably in the carrier 40, is provided with a gear 48 meshing with the gear 46. The chuck is constructed with a telescoping member normally pressed downward by a spring 49.

The lower chuck carrier 41 is provided with a bracket 50 on which there is mounted a roller 51 which contacts a cam 52 on the drum 21.

Fixedly mounted between the two chucks is a heating and quenching head 55. This head constitutes a suitable inductive heating means which will be described later. It is also provided with channels leading to nozzle openings 56 in position to spray an article being passed through the head. Pipes 57 supply quenching fluid to the head from channels 58 in the hub of the turret which rests upon a member 59 at the top of the drum, which is provided with a chamber 60 supplied with cooling fluid through a pipe 61 from any suitable source.

Figures 5, 6:
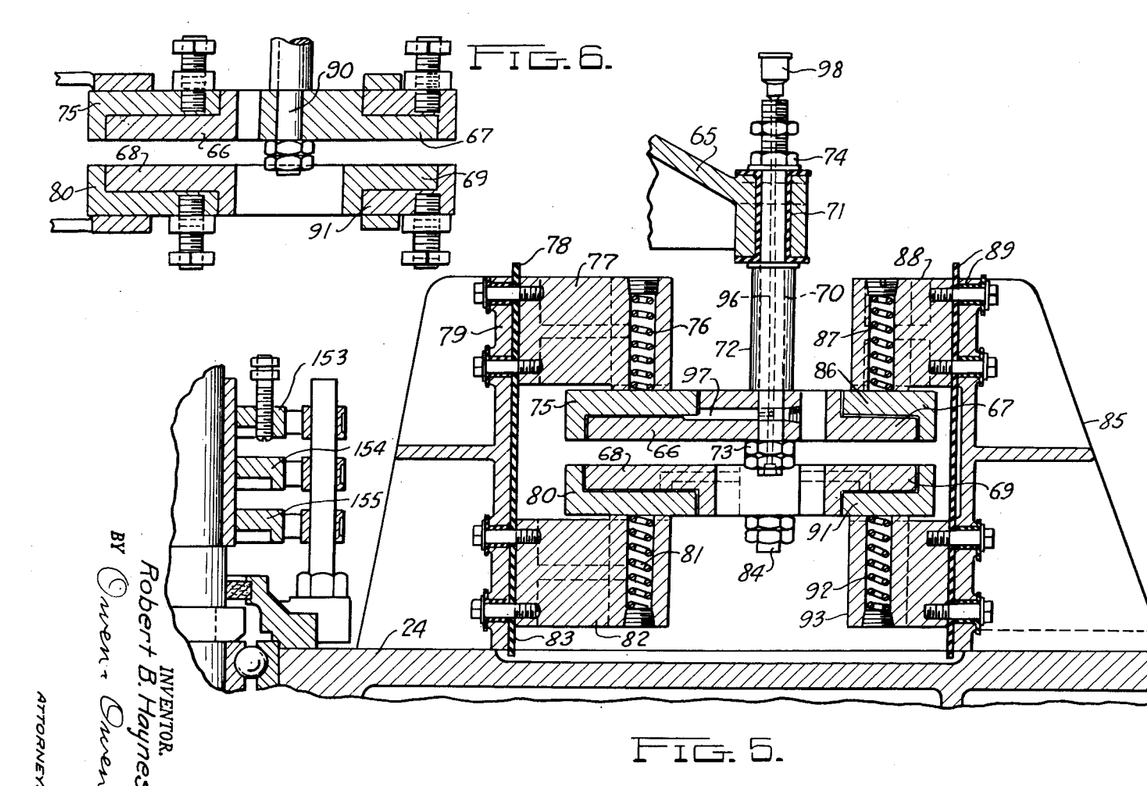
Fig. 5 is an enlarged section of the collector rings on line 5—5 of Fig. 4.
Fig. 6 is similar to Fig. 5, but on line 6—6 of Fig. 4.
Figure 7:
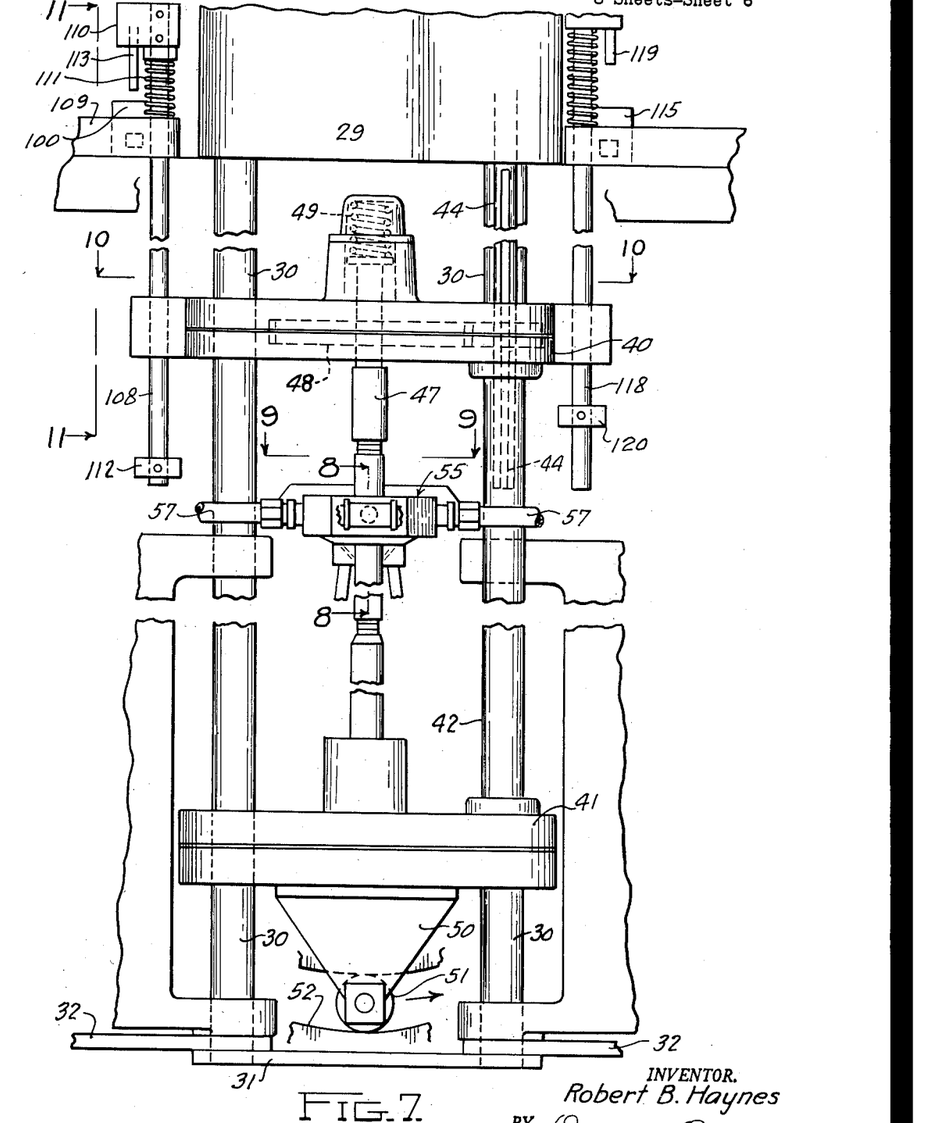
Fig. 7 is a side elevation of one unit of the machine with parts broken away and parts removed.
Figure 8:
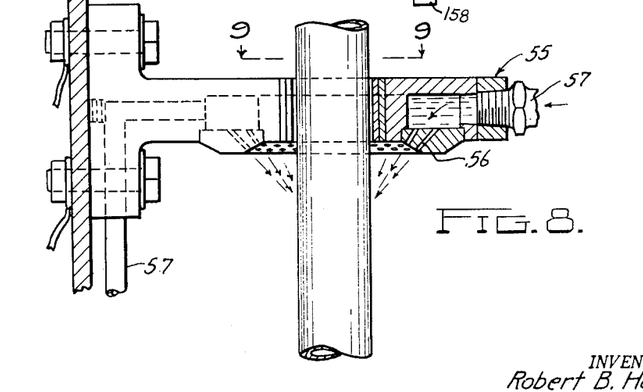
Fig. 8 is a vertical section of the heating and chilling device on the line 8—8 of Fig. 7.

A stationary spider 65 is mounted upon the top of shaft 22. As best shown in Fig. 5, there are provided an upper inner contact ring 66, an upper outer contact ring 67, a lower inner contact ring 68 and a lower outer contact ring 69. A bolt 70 is provided for suspending ring 66. The bolt is insulated by insulation 71 from the spider 65. Beneath the spider there is a sleeve 72 around the bolt, and nuts 73 on the lower end of the bolt hold the contact ring 66 firmly against the lower end of the sleeve. The bolt is held in adjusted vertical position by means of nuts 74 on its upper end.

Contacting the upper side of ring 66 there is a collector ring 75 which is pressed downward by a spring 76 onto contact plate 66. The spring 76 is held in a bracket 77 which is insulated by insulation 78 from a bracket 79 mounted on the upper turret plate 24.

A collector ring 80 is located beneath contact ring 68 and is pressed upwards thereagainst by a spring 81 mounted in a bracket 82 insulated by insulation 83 from bracket 79. A bolt 84 similar to bolt 70 is provided for supporting contact ring 68. A bracket 85 is mounted on the upper turret plate 24 outside of the contact and collector rings, and is similar to bracket 79 and carries a collector ring 86 in contact with the upper surface of contact ring 67, being pressed down by a spring 87 in bracket 88 insulated by insulation 89 from bracket 85. Ring 67 is supported by a bolt 90 similar to bolt 70.

A collector ring 91 is pressed upward by spring 92 in bracket 93 against the lower surface of contact ring 69. Bracket 93 is insulated by insulation 94 from bracket 85. A bolt 95 similar to bolt 70 supports ring 69.

Figure 2:
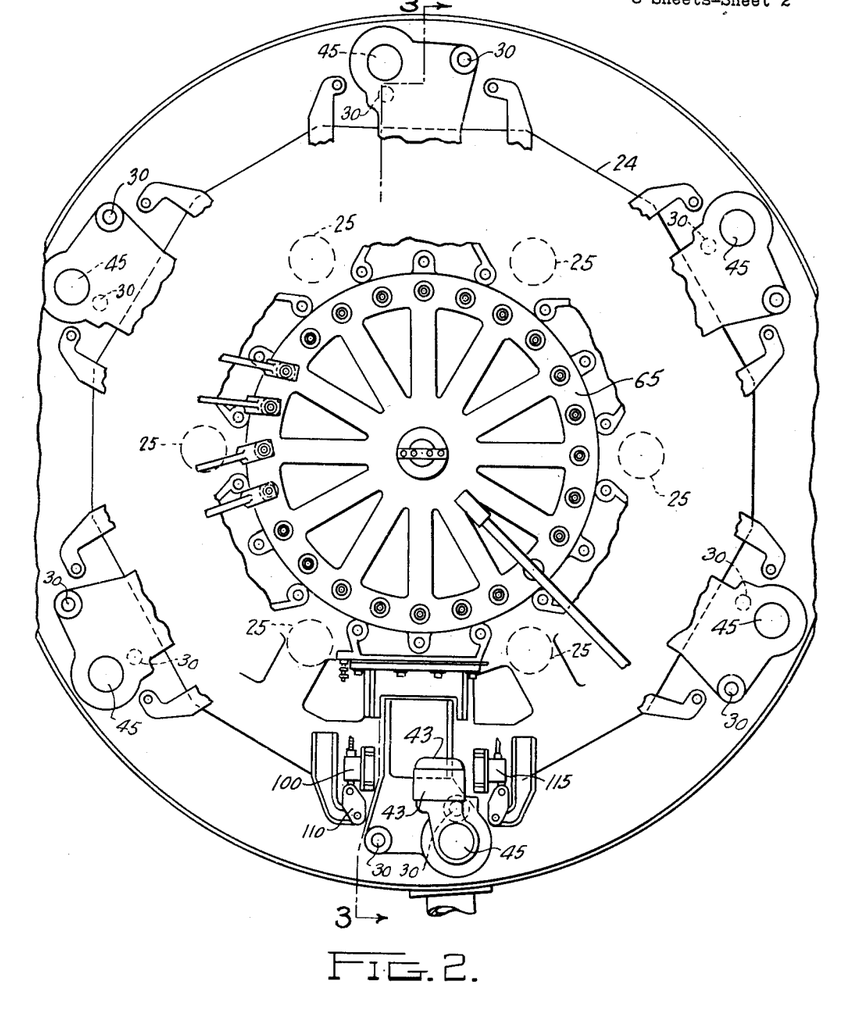
Fig. 2 is a plan view of the apparatus.
Figure 4:
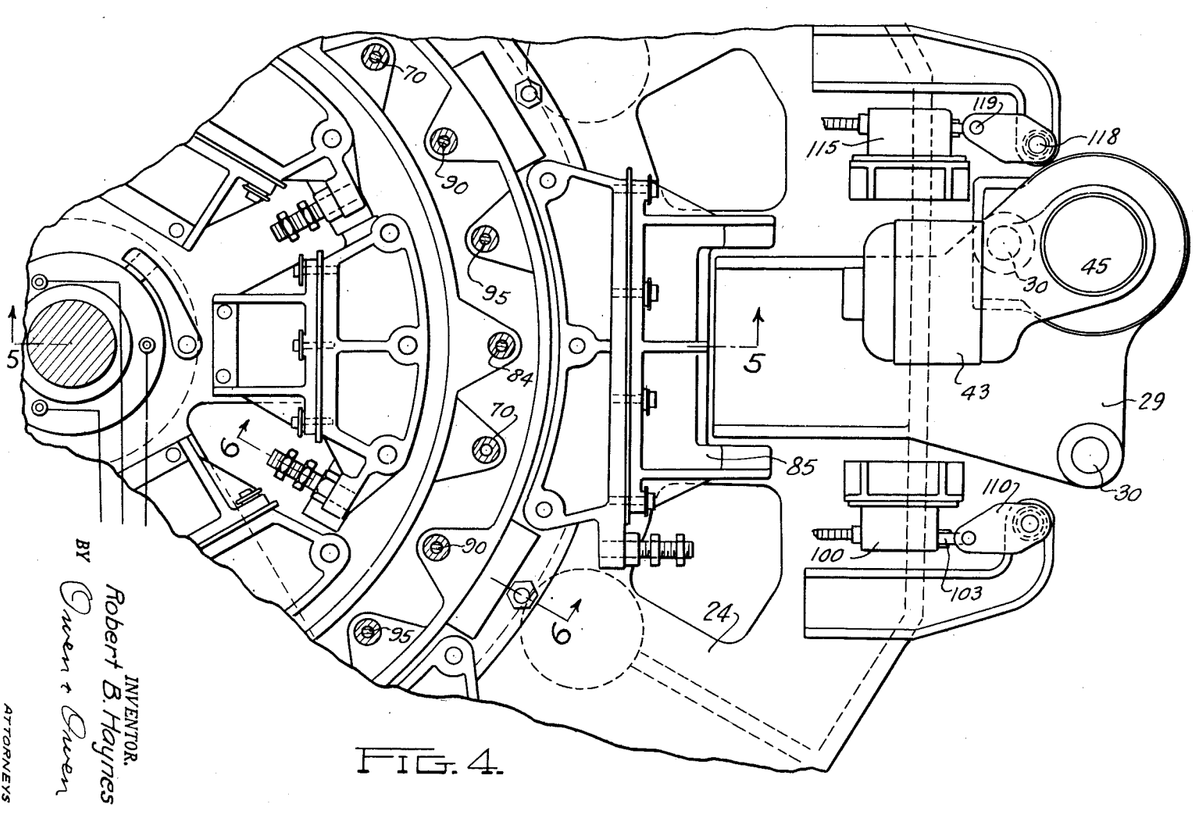
Fig. 4 is an enlarged plan view of one unit of the machine.

As will be seen, bolt 70 is provided with an oil duct 96 which connects with a duct 97 through ring 66 to its surface which contacts with collector ring 75, and keeps the contacting surfaces lubricated. As will be seen from Figs. 2 and 4, there are a plurality of bolts for supporting each of the contact rings. It is not necessary to provide all of these bolts with oil ducts, but one or more are so provided for each of the contact rings. An oil cup 98 may be provided on the top of each of the bolts arranged for oiling the supported ring.

A limit switch 100 is mounted near the top of the unit. Pivoted at 101 in the switch box there is a bell crank lever having a lower arm 102 and an upper arm 103. Projecting upwards from the upper chuck carrier there is a rod 104 having pivoted thereon a dog 105. Above the dog there is a pin 106 to limit its upward movement. A spring 107 normally holds the dog up against pin 106.

Figures 9, 11, 12, 13:
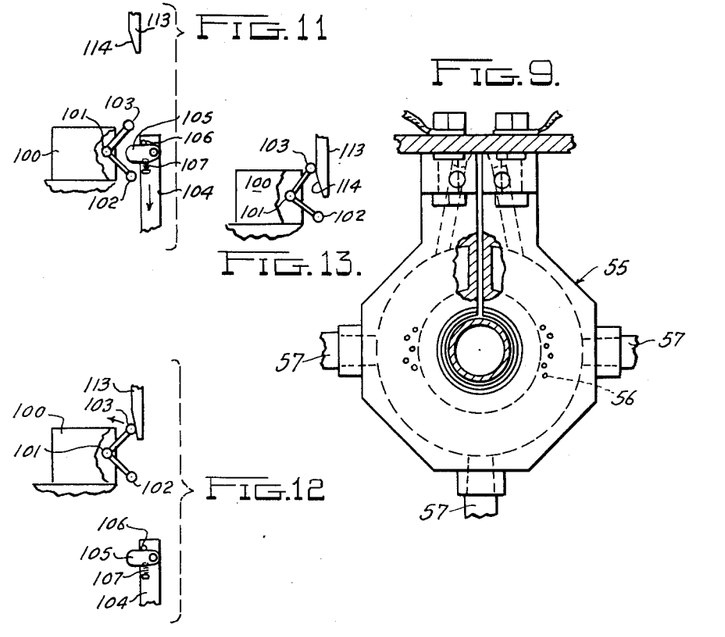
Fig. 9 is a plan of the heating device on the line 9—9 of Figs. 7 and 8.
Figs. 11, 12 and 13 are detail views of switch operating means.

At the left of the unit there is a trip rod 108 which is slidably mounted in the upper turret plate and the upper chuck carrier, the upper end of the rod sliding through a bracket 109 on the turret. There is a head 110 on the upper end of the trip rod and a spring 111 between this head and bracket 109 normally holds the head a certain distance above the bracket. Below the upper chuck carrier there is a collar 112 on the trip rod 108, so that downward movement of the chuck carrier, after contacting the collar 112, lowers the rod and compresses spring 111. Projecting downward from head 110 there is a cam peg 113 having a cam surface 114. It will be seen that, upon upward movement of the upper chuck carrier, the dog 105 will yield and slip past arm 102 to the position in which it is shown in Fig. 11. When the upper chuck carrier starts down the dog contacts arm 102 and turns the bell crank lever to the left, thereby actuating the switch. When the upper chuck carrier actuates rod 108 by contact with collar 112, cam surface 114 contacts arm 103 and returns the bell crank lever, as shown in Fig. 13, to the position in which it is shown in Fig. 11.

Figure 1:
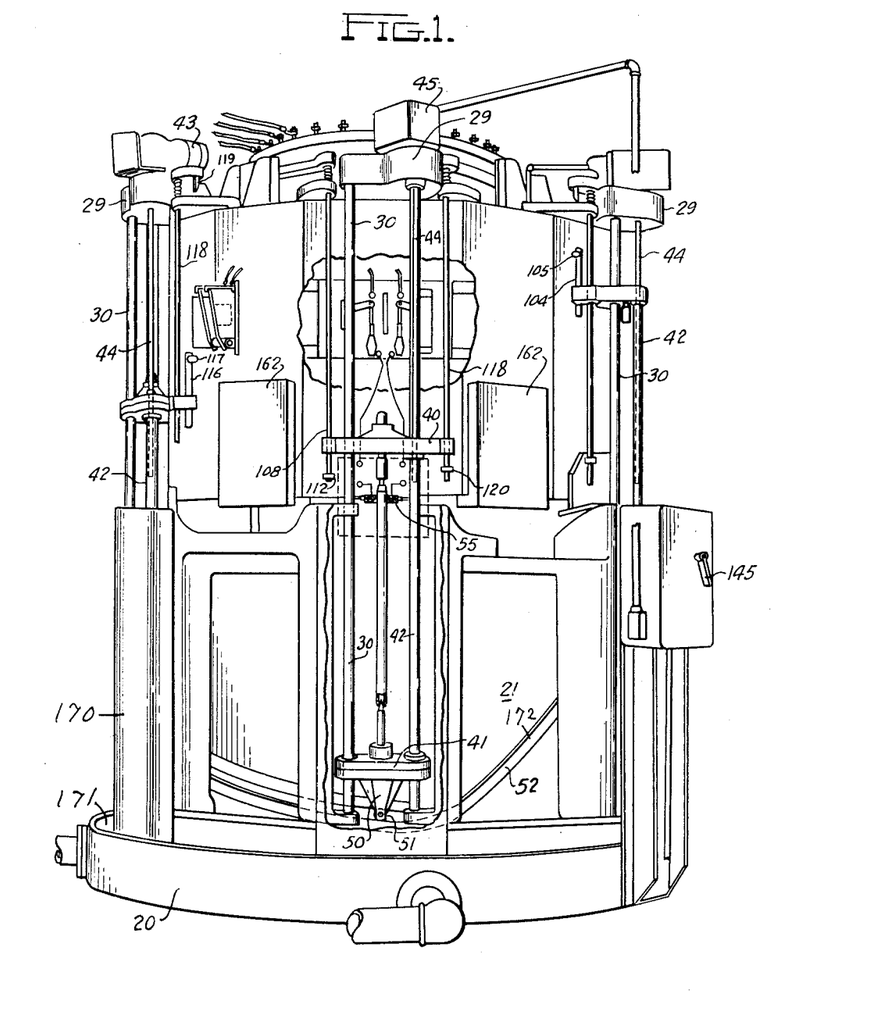
Fig. 1 is a side elevation of one embodiment of the invention, with parts broken away and parts removed for purposes of illustration.

On the right hand side of the unit there is a second switch 115, a rod 116 carrying a dog 117, (see Fig. 1) and a trip rod 118 carrying a cam peg 119 at its upper end and having a collar 120 at its lower end. The arrangement of the switch and its operation at the right of the unit is similar to that at the left except that the collar 120 at the right is somewhat higher than collar 112 at the left, for reasons which will be explained later.

Figures 14, 15:
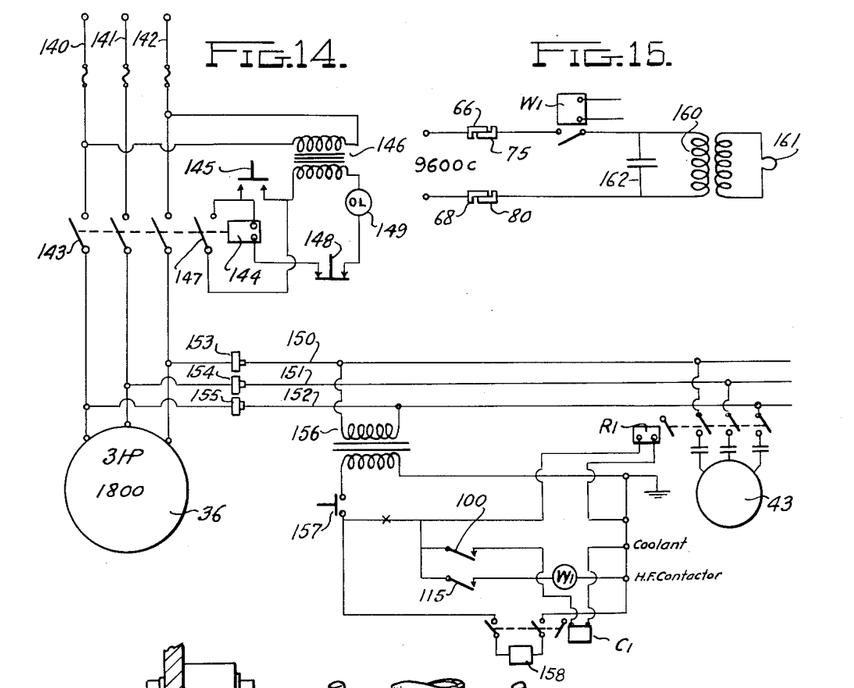
Figs. 14 and 15 are wiring diagrams.

The electrical circuits for the machine are shown in Figs. 14 and 15 and include a low frequency circuit to operate the main drive motor 36, the station drive motors 43, and the various relays for additional operations. The low frequency circuit is taken from a 440 volt, 60-cycle, three-phase source through fused leads 140, 141 and 142, through a main contactor 143 which may conveniently be a four-pole magnetically operated switch, three of the poles of which are in the main motor circuit. The main contactor 143 is closed by a solenoid 144 through the medium of a start button 145. The voltage for the solenoid is taken from the secondary of a transformer 146, the primary of which is across one phase of the three-phase source. Closing of the start button energizes the solenoid 144 and closes a holding contact 147 so that when the start button is released the circuit to the solenoid 144 will remain closed. The circuit is subsequently broken when it is desired to stop the machine by a stop button 148, and overload protection is had from a conventional overload relay 149 which, upon overload, will open the circuit through solenoid 144.

Figure 3:
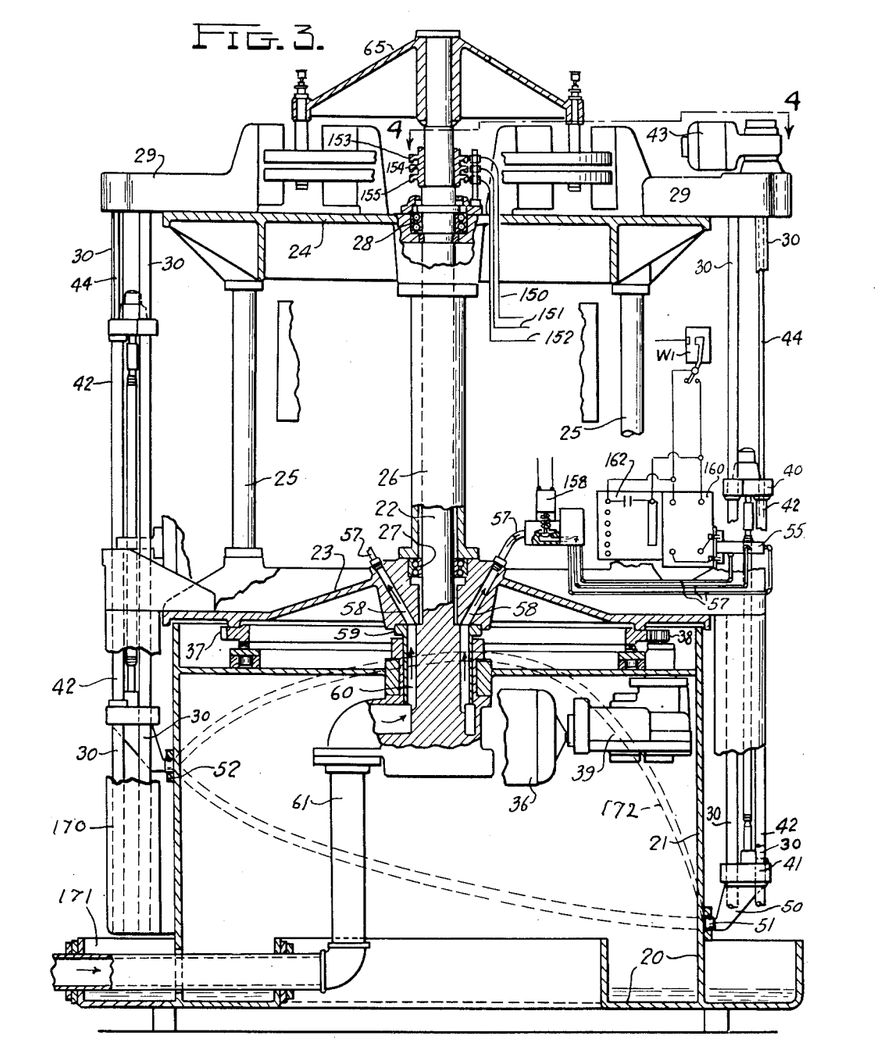
Fig. 3 is a vertical section on the line 3—3 of Fig. 2 also with parts broken away and parts removed.

As previously stated, there are six heat treating stations incorporated in the machine, and electrically each of these stations takes its power in parallel with the others through leads 150, 151 and 152, which are connected to the 440 volt source by means of slip rings 153, 154 and 155 at the top of the center column, as indicated in Fig. 3. In the interest of clarity, Fig. 14 shows the circuits for only one station. As there indicated, motor 43 is operated from the leads 150, 151 and 152 through a relay $R_1$, the energizing circuit for which is included in the secondary circuit of a transformer 156 which reduces the 440 volt supply voltage to some convenient voltage such as 110 volts. A station operating button 157 is provided in the secondary circuit of transformer 156 and unless closed will prevent the operation of any of the devices associated with the particular station at which the button is located. Four parallel circuits are provided through the secondary of transformer 156, all of which are controlled by the station operating button 157. The four parallel circuits include relay $R_1$, a coolant control holding coil $C_1$ in series with limit switch 100, a high frequency contactor $W_1$ in series with limit switch 115 and a quench valve 158 to control the flow of water or quenching fluid over the work piece. It will be seen from the above that the coolant control holding solenoid $C_1$ operates only when switch 100 is closed as well as the station operating button 157, and the high frequency contactor $W_1$ will be closed only when switch 115 is in its closed position as well as switch 157.

The high frequency circuit is shown in Fig. 15. The high frequency voltage is taken from any suitable source, and the frequency used for heating, in the present instance, has been selected as 9600 cycles. Because of the high power requirements, it is preferred to use two similar generators, each of which feeds power to three stations, although in some instances a single high frequency generator would be sufficient. The circuit for one of the generators and one of the stations is indicated in Fig. 15, and as there shown includes the 9600 cycle source which is connected to stationary contact rings 66 and 68 with which moving collector rings 75 and 80 cooperate to take off current for the station heating elements. A transformer 160 is placed directly across the 9600 cycle source whenever the station high frequency contactor W1 is closed and the secondary of the transformer includes a single turn heating inductor 161 through which the work passes in a manner subsequently described. A power factor correcting capacitor 162 is also provided, since the load of the machine is so completely inductive that the power factor of the entire line will be disturbed unless provision is made to correct it. Capacitor 162 is carried on the rotating turret and is made adjustable so that, as the character of the work is changed, correction of the power factor can be established without difficulty.

For ready understanding of the operation of the apparatus, the successive movements at a single station will be described.

When the chuck carriers are raised to their highest position, the upper end of an axle, or other object to be treated, is inserted in the upper chuck and is pressed upward, compressing spring 49, until the lower end of the axle can be swung into position above the lower chuck and lowered thereonto. It will be noted that the upper end of the lower chuck is above the heating unit at this time.

Presuming that starting button 145 has been operated to energize the turret turning motor 36, as described in connection with the wiring diagram, the loaded unit is moved by the turret so that roller 51 travels down cam 52 and lowers the chuck carriers. Presuming that station starting button 157 has been operated, motor 43 is driving the upper chuck continuously through splined shaft 44 and the connecting gearing.

As the chuck carriers start downward, dog 105 closes switch 100 and energizes the induction heating circuit, and dog 117 closes switch 115 and opens the valve starting flow of cooling fluid to the nozzle 56. These operations occur as the upper end of the lower chuck, and therefore the lower end of the article being treated, is lowered through the heater and nozzle, respectively.

During continued movement of the unit, with the axle in the chucks constantly turning, the axle is progressively heated as it is lowered through the induction heater. The cam 52 is shaped to govern the rate of lowering so that each successive portion of the elongated article is subjected to the desired amount of heating. A control device might be operated by the lowering of the holders to vary the rate of heating, if desired, but this is not ordinarily required, and control of the heating by varying the rate of lowering of the chucks is generally found both sufficient and preferable.

When roller 51 approaches the lowest point on cam 52, so that the upper end of the axle passes below the heater, the upper chuck carrier contacts collar 112 and lowers rod 108, whereupon cam peg 113 contacts arm 103 and opens switch 100, stopping the flow of coolant fluid. Thereafter the chucks are lowered further until roller 51 reaches the bottom point of cam 52. The upper end of the axle is thus brought down below the heater into the quenching zone, and collar 120 is forced downward whereby rod 118 is lowered and cam peg 119 opens switch 115, stopping the heating action.

The hardened article could be removed while the chucks are in their lowest position, just after the completion of the above-described movements. However, it is preferable to provide a shield 170 in front of the unit, to guide the quenching fluid into a suitable trough 171 in the base of the machine. The cam 52 is provided with a relatively steep rise, as indicated at 172 on Fig. 3, so that the chucks are quickly raised to their upper position, and the treated article can then be removed and replaced by an untreated article, without obstruction by the shield.

It will be seen that the articles to be treated, such as axles, may be inserted in the chucks at one point in their movement, and the apparatus automatically lowers the article through the heating and quenching zones at a speed determined by the shaping of cam 52, so that portions requiring longer heating move through the heating zone more slowly than those requiring less heating. The energizing of the heater and the flow of quenching fluid are automatically controlled by the operation of the machine so they are utilized when needed and not wasted when not needed. The large flow of power in the high frequency current is readily transmitted without overheating through the contact and collector rings, and their contacting surfaces may be lubricated to avoid objectionable wear. Employment of slip rings and brushes, as is common in electrical connections between rotary and stationary parts, would be troublesome with such large flow of high frequency current, and the arrangement described is a very important improvement.

The vertical position of the article and the controlled downward movement thereof through the heating zone and then the quenching zone makes possible accurate control of the heating of successive parts and effective quenching of each successive part at the proper time without any danger of the quenching fluid interfering with the heating operation.

While one form of apparatus has been shown and described in some detail, many changes may be made within the scope of the appended claims while retaining some of the advantages of the invention.

What I claim is:

1. Induction hardening apparatus comprising a turret rotatable about a vertical axis, an annular series of treating units mounted upon the turret, one unit comprising two vertically spaced coaxial chucks, an annular induction heating unit co-axial with the chucks and normally between them, a stationary cam, connections operated by the movement of the turret and unit with respect to the cam to raise and lower the chucks, the lower chuck extending up through the heater in its highest position, and the lowering of the chucks with an article mounted therein moving the article in timed relation to the rotation of the turret controlled by the cam downward through the heating device, means operated by the initial downward movement of the chucks to energize the heating device, and means controlled by the movement of the chucks as they approach their lowest position to de-energize the heating device.

2. Induction hardening apparatus comprising a drum with its axis vertical, a barrel cam on the exterior of the drum, a turret mounted for rotation above the drum, a plurality of hardening units mounted on the turret in an annular series, each unit comprising a vertical post, upper and lower chucks mounted slidably upon the post and adapted to hold an elongated article vertically therebetween, means connecting the chucks to the cam whereby rotation of the turret and movement of the unit about the drum causes vertical movement of the chucks, an induction ring heater mounted in fixed position with respect to the post, a cooling nozzle below the heater, the parts being so arranged that the lower chuck projects upward through the heater when the chucks are in their highest position and the upper chuck projects downward through the heater when the chucks are in their lowest position, a switch controlling the flow of current to the heater, a switch controlling the flow of fluid to the cooling nozzle, means actuated by the initial downward movement of the chucks from their highest position to operate said switches to start heating and cooling action, means actuated by movement of the chucks as they approach their lowest point for operating the heating switch to stop heating, and means actuated by the movement of the chucks to a lower point to operate the cooling fluid switch to cut off the flow of cooling fluid.

3. Induction hardening apparatus comprising a series of hardening units, means to move the units in succession through an endless path, each unit comprising a chuck carrier, two co-axial chucks mounted on the carrier to face each other and support an article to be treated therebtween, and with said axis perpendicular to the line of movement in said path, annular induction heating means and quenching means co-axial with the chucks, means actuated by the movement of the unit in said path to reciprocate the chuck carrier axially of the chucks, the article-engaging member of each chuck having a support extending from its mounting on the carrier towards the other chuck a distance long enough to extend axially through the heating and quenching means, said reciprocating means being constructed to reciprocate the carrier from a position with the support of one chuck extending through the heating and quenching means to a position with the support of the other chuck extending through the heating and quenching means, means actuated by the initial movement of the carriage away from one of its said positions to energize the heater, and means actuated by the approach of the carriage to its other said position to de-energize the heater.

4. Induction hardening apparatus comprising a turret rotatable about a vertical axis, an annular series of treating units mounted upon the turret, a drum inside of the path of the annular series, and a barrel cam on the drum, each unit comprising vertically spaced co-axial chucks slidable vertically together as a unit and a connection from the chuck unit to the cam for raising and lowering the unit as it revolves about the drum, and heating and quenching means in position to treat an article held in the chucks while the chucks are being lowered, said heating and quenching means comprising an annular induction heater co-axial with the chucks and an annular spray nozzle below and co-axial with the heater, the lower chuck extending up through the heater in its highest position and the upper chuck extending down through the quenching nozzle in its lower position, and comprising means for energizing the induction heater governed by the initial downward movement of the chucks, and means for de-energizing the heater governed by the approach of the chucks to their lowest position.

5. Induction hardening apparatus comprising a turret rotatable about a vertical axis, an annular series of treating units mounted upon the turret, a drum inside of the path of the annular series, and a barrel cam on the drum, each unit comprising vertically spaced co-axial chucks slidable vertically together as a unit and a connection from the chuck unit to the cam for raising and lowering the unit as it revolves about the drum, and heating and quenching means in position to treat an article held in the chucks while the chucks are being lowered, said heating and quenching means comprising an annular induction heater co-axial with the chucks and an annular spray nozzle below and co-axial with the heater, the lower chuck extending up through the heater in its highest position and the upper chuck extending down through the quenching nozzle in its lower position, and comprising means for energizing the heater and for supplying cooling fluid to the nozzle as the lower chuck moves downward through the heater and nozzle, respectively, and means for de-energizing the heater and shutting off the flow of fluid to the nozzle as the upper chuck moves downward through the heater and nozzle, respectively.

ROBERT B. HAYNES,

REFERENCES CITED

The following references are of record in the file of this patent:

UNITED STATES PATENTS

| Number | Name | Date |
|---|---|---|
| 406,890 | Dewey | July 16, 1889 |
| 1,361,120 | Weatherby | Dec. 7, 1920 |
| 1,383,963 | Mordey | July 5, 1921 |
| 1,566,370 | Briscoe | Dec. 22, 1925 |
| 1,592,662 | Gilman | July 13, 1926 |
| 1,911,046 | Wright | May 23, 1933 |
| 2,124,329 | Zimmerman | July 19, 1938 |
| 2,177,299 | Fredrickson | Oct. 24, 1939 |
| 2,182,799 | Farr | Dec. 12, 1939 |
| 2,184,280 | Clark | Dec. 26, 1939 |
| 2,202,758 | Denneen et al. | May 28, 1940 |
| 2,202,759 | Denneen et al. | May 28, 1940 |
| 2,205,680 | Caputo | June 25, 1940 |
| 2,206,747 | Mirfield | July 2, 1940 |
| 2,280,111 | Widell | Apr. 21, 1942 |
| 2,318,468 | Denneen et al. | May 4, 1943 |
| 2,333,055 | Terrell | Oct. 26, 1943 |
| 2,390,559 | Sherman | Dec. 11, 1945 |
| 2,396,612 | Somes | Mar. 12, 1946 |
| 2,402,186 | Sherman | June 18, 1946 |
| 2,411,698 | Somes | Nov. 26, 1946 |
| 2,412,797 | Berliner | Dec. 17, 1946 |

OTHER REFERENCES

The Iron Age, page 90C, February 2, 1939.